Figure 1:
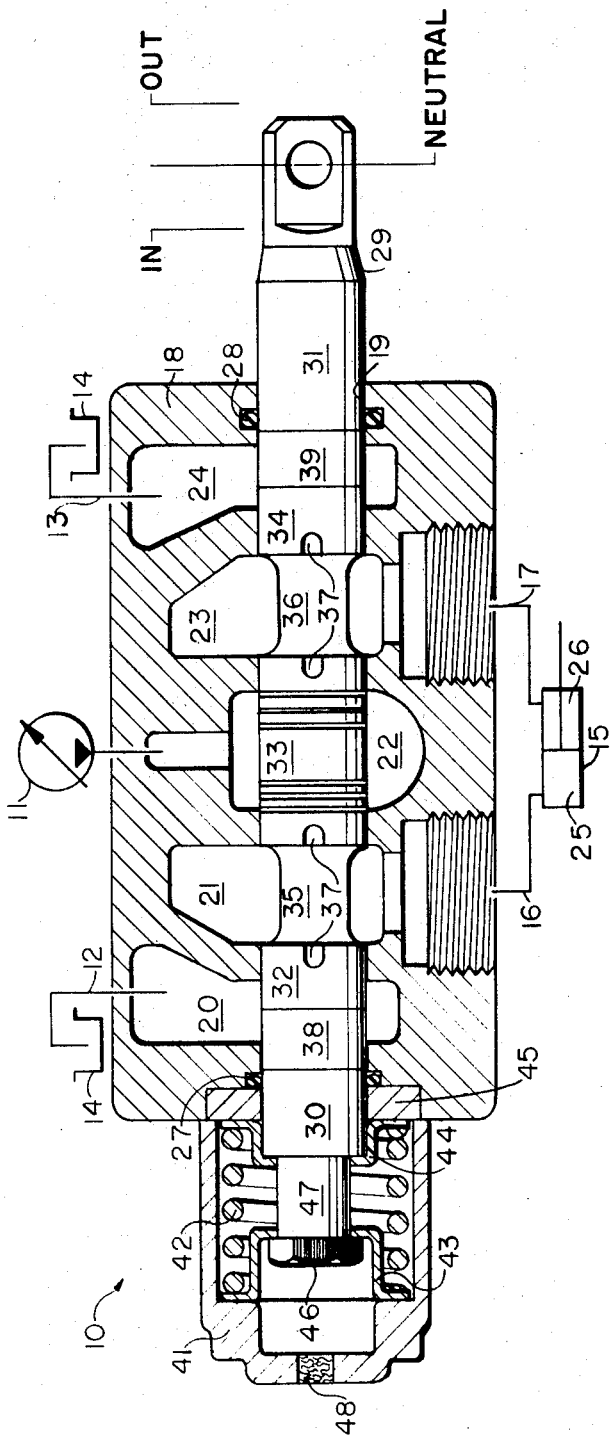

United States Patent

[11] 3,557,824

| [72] | Inventors | Robert D. Krehbiel<br>Hutchinson, Kans.;<br>Warren E. McCammond, Hutchinson, Kans. |
|---|---|---|
| [21] | Appl. No. | 772,668 |
| [22] | Filed | Nov. 1, 1968 |
| [45] | Patented | Jan. 26, 1971 |
| [73] | Assignee | The Cessna Aircraft Company<br>Wichita, Kans.<br>a corporation of Kansas |

[54] SPOOL CONTROL VALVE
2 Claims, 2 Drawing Figs.

| [52] | U.S. Cl. | 137/375, 251/368 |
|---|---|---|
| [51] | Int. Cl. | F16k 25/04 |
| [50] | Field of Search | 251/368; 137/625.48, 375 |

[56] References Cited
UNITED STATES PATENTS

| 2,822,824 | 2/1958 | Glower et al. | 251/368X |
| 2,926,884 | 3/1960 | Clinkenbeard | 251/368X |
| 2,985,566 | 5/1961 | Tsien et al | 251/368X |

*Primary Examiner*—Arnold Rosenthal
*Attorneys*—Gregory J. Nelson and Hubert E. Miller ABSTRACT: A fluid control valve including a spool whose end exposable to corrosion environment is tapered to a reduced diameter and coated with corrosion resistant material. The reduced diameter facilitates fast, economical final machining and sizing of the spool without damaging the protective coating, for selective fitting within a fluid control valve body bore.

PATENTED JAN 26 1971

3,557,824

INVENTORS
ROBERT D KREHBIEL
WARREN E McCAMMOND

BY *Gregory J. Nelson*
ATTORNEY

SPOOL CONTROL VALVE

This invention relates to fluid flow control valves. More specifically, the invention relates to an improved flow control valve and valve spool and method of manufacturing same.

Reciprocating spool type directional control valves comprise in general a body having a longitudinal spool bore and fluid carrying passages communicating with the bore. A spool reciprocable within the bore can be positioned as desired to selectively interconnect certain passages through grooves in the spool and block communication between other passages by lands on the spool that fit closely to the body at locations between the passages. For proper operation, it is therefore necessary that the cooperating elements, the spool bore and diameter of the spool lands, be properly sized to very close dimensions.

Rather than machine the valve body spool bore and valve spool to exacting tolerances, it has been found more practical and economical to selectively fit the spools and bodies. Selective fitting generally includes the steps of machining the two cooperating elements to less exacting tolerances, measuring the critical dimension of one of the elements, then machining the second element to fit this dimension, and then selectively matching a pair of elements which fit within the tolerance required. Thus, the spool is initially made to oversize dimension and after determining the bore sizes of bodies available, is then machined to a final dimension closely matching the available body bore sizes. It has been found feasible only to perform the final machining operation on the spool rather than the body bore; that is, size the spool to fit the bore rather than size the bore to the spool.

This final machining has created a problem in that it will remove any protective material, such as chrome-plating, on the spool. A prior solution, plating the spool after final sizing, unduly delays production and assemblage of the valves, or necessitates a large inventory of finally machined and chrome plated spools in all the numerous sizes which may be required to fit the bodies.

It can thus be seen that a valve spool capable of being finally machined without injuring or removing a protective coating on the spool, will enhance the production and manufacture of reciprocating spool control valves. Leaving this precise spool sizing as the final step in the valve manufacture will also reduce handling of the completed spool and attendant accidental damage.

Accordingly, it is an object of this invention to provide a directional control valve construction readily adaptable to a final spool machining operation.

A more particular object of the invention is to provide a valve spool capable of being machined without injuring the protective material covering a portion of the spool.

Yet another object is to provide a control valve assembly including a spool of selective fit diameter with a chrome-plated, reduced diameter end portion and a tapered diameter portion extending from the reduced to the selective fit diameter, and a resilient element capable of sealing against both the reduced end and tapered portions of the spool.

Figure 2:
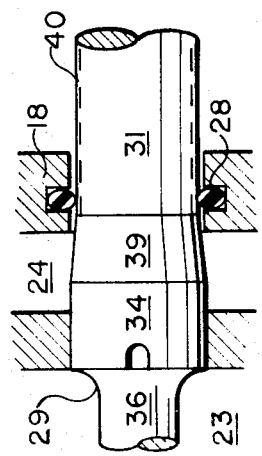

Other objects and advantages of the invention will become apparent in the following description and accompanying drawings in which:

FIG. 1 is a partial longitudinal section of a control valve built in accordance with the invention and additional schematic representation of a typical hydraulic system; and FIG. 2 is an enlarged view of one end of the valve spool of FIG. 1.

DESCRIPTION

FIG. 1 illustrates a directional control valve 10 interposed in a fluid power system including a source of fluid 11, fluid return lines 12 and 13 leading to reservoir 14, and a double acting linear cylinder motor 15. Valve 10 directs fluid flow between the pump and reservoir and either end of cylinder 15 through conduits 16 and 17.

Valve 10 includes a cast body 18 having a longitudinal bore 19 and five transverse passages 20—24 intersecting bore 19 at spaced positions. Passages 20 and 24 communicate with low pressure return lines 12 and 13 while work passages 21 and 23 respectively connect with ends 25 and 26 of cylinder 15 through conduits 16 and 17. Variable displacement fluid pump 11 supplies motive fluid to passage 22 in body 18. Near either end of bore 19 are seal receiving grooves in body 18 in which are disposed resilient sealing member O-rings 27 and 28.

Slidably disposed in and closely fitting bore 19 is control spool 29 having ends 30 and 31 extending out of the body 18. Land portions 32, 33 and 34 of spool 29 cooperate with the body lands formed between the passages in body 18 to isolate from one another the fluid passages 20 through 24 when the spool is in the neutral position shown. A pair of grooves 35 and 36 of substantial length interconnect the body fluid passages in a predetermined manner as spool 29 is manually shifted to cylinder actuating positions as will be more fully described. Metering notches 37 on spool 29 provide precise control of fluid flow to and from cylinder 15 and speed of movement of the cylinder rod and piston.

The outer ends 30 and 31 of the spool have a diameter slightly less than the diameter of lands 32, 33 and 34. The outer portions of the spool, including sections 30 and 31, are chrome plated to deter corrosion of the portions of the spool extendable outside body 18. Section 38 of the spool intermediate reduced diameter portion 30 and outer land 32, is gradually tapered with a diameter smoothly varying from the end diameter to the land diameter. A similar tapered portion 39 is present between outer land 34 and reduced diameter end 31. As the spool is shifted within bore 19, seals 27 and 28 can compress against both the reduced diameter ends and tapered portions of spool 29 to prevent fluid leakage from body 18 through bore 19 in all spool positions. The tapered portions preclude sharp edges on the spool from passing through and cutting O-rings 27, 28, as well as reducing sticking and binding of the spool within bore 19.

FIG. 2 is an enlarged view of the right end of spool 29 clearly showing the tapered portion 39 in exaggerated detail. The chrome-plating 40 (also illustrated in exaggerated proportion) on end section 31 is shown by the dotted line and covers the complete surface of the spool end which may protrude from the body in various spool positions. Though the plating 40 is shown ending at approximately the start of the taper 39, it may extend onto the taper or whole spool if desired. End portion 31 is diametrically reduced from land 34 sufficiently that subsequent machining of the spool lands, to be presently described, will not touch chrome-plating 40 on end 31. The length of taper portion 39 can vary substantially; however, it has been found desirable in some applications to position taper 39 so that it cannot span from passage 24 to passage 23 and allow leakage therebetween, as spool 29 is moved in bore 19. Thus, as spool 29 is moved leftwardly to the position denoted "in," taper portion 39 will not extend into passage 23. Taper 38 is similarly located to inhibit undue leakage between passages 20 and 21 when the spool is moved rightwardly to its "out" position.

A spool centering assembly contained within a cap 41 bolted to body 18 is attached to the left end of spool 29 to bias the spool to its neutral position. Spring 42 urges a pair of cup-shaped washers 43, 44, oppositely toward cap 41 and an insert washer 45 which is disposed in a recess in body 18. Cup washer 43 bears against the head of a bolt 46 threadably attached to the left end of spool 29, while cup washer 44 is urged directly onto the left end of the spool. A hollow, cylindrical spacer 47 through which bolt 46 extends, separates the head of bolt 46 from the left end of the spool. Spacer 47 fits loosely within central openings in cup washers 43 and 44 to slide easily therethrough during movement of spool 29. Metallic filter packing material 48 is contained within a pressure relieving breather opening in cap 41, whereby the interior of the cap and portion 30 of spool 29 are subject to the corrosional environment surrounding body 18.

Shifting of spool 29 either direction from the center neutral position shown compresses centering spring 42 through movement of one of washers 42, 43. Upon consequent release of the spool, spring 42 returns spool 29 to neutral.

In operation of valve 10, moving spool 29 rightwardly directs motive fluid to chamber 25 of cylinder 15 by interconnecting inlet passage 22 with cylinder work passage 21 through groove 35. Washer 43 is constrained by bolt 46 to move with spool 29 toward washer 44 and compress spring 42. Consequent rightward movement of the cylinder piston and rod displaces fluid out of chamber 26 into conduit 17 and cylinder work passage 23 from where it is directed through groove 36 into fluid drain passage 24. Releasing spool 29 then allows spring 42 to urge cup washer 43 leftwardly and return spool 29 to neutral, wherein work passages 21 and 23 are isolated and the piston of cylinder 15 is hydraulically locked in position. Similarly, leftward spool travel from neutral directs fluid from pump 11 through spool groove 36 into cylinder chamber 26, and directs displaced fluid from chamber 25 and passage 21 through groove 35 to drain passage 20.

MANUFACTURE

Certain methods of manufacture of valve spools such as spool 29 require a final, precise machining of the diameter of lands 32, 33, 34, to a desired dimension. Further, to facilitate fast, economical production of the control valve as well as to minimize handling and attendant damage, it is desireable that such final machining and sizing be the last step in manufacture prior to assembling the body, spool and other components of the valve 10. Consequently, completing time consuming steps such as chrome plating of the spool prior to final machining as contemplated by the present invention, makes final sizing techniques feasible to valve spool mass production.

The valve production technique herein termed selective fitting of spools and bodies is an example of a method of manufacture advantageously utilizing a final sizing machining. From a single stock of slightly oversized spools, final machining of the spools to varying diametral dimensions dictated by valve bodies available for assembly, precludes a stockpile of spools for each diameter which may be required by the valve bodies.

Spool 29 is machined from a cylindrical bar stock to the desired design leaving a substantially oversized basic diameter larger than bore 19 of body 18. Ends 30 and 31 are ground to a reduced diameter less than, and outside the tolerance range of valve body bore 19 diameter. The tapered surfaces 38 and 39 are machined at the same time.

A layer of chrome of desired thickness is electrolytically deposited on and bonded to ends 30 and 31, after which spool 29 can be stockpiled.

Body 18 is completely machined, including bore 19, to required dimensions, and the actual bore diameter is recorded when it is inventoried and stored.

When it is desired to build and assemble several control valves 10, each spool 29 is finally machined to a land diameter closely matching the bore diameter of one of the bodies available for assembly. For example, to fit a spool within .0001 inch to a body bore machined to a tolerance of .0015 inch, the spool is machined by an external centerless grinder to any one of fifteen different dimensions. The final dimensions of the spool lands are recorded, and the spools and bodies are subsequently selectively paired for assembly such that spools 29 fit as closely to bores 19 as required for proper valve operation.

The foregoing description of control valve 10 and its manufacture is to be considered as exemplary in nature and not limiting to the scope and spirit of the invention as set forth in the appended claims.

Having described my invention with sufficient clarity that those skilled in the art may make and use it,

We claim:

1. In a fluid flow control valve assembly including a body having a spool receiving bore and fluid passages communicating with the spool bore at spaced positions;
   a. spool means slidably disposed in said bore movable to operating positions interconnecting certain of said fluid passages through said bore;
   b. land means on said spool cooperating with said body to block fluid communication between certain adjacent fluid passages in various spool positions; wherein the improvement comprises,
   c. a reduced diameter portion of said spool extendable exteriorly of said body having a diameter less than the diameter of said land means;
   d. protective material bonded to and covering at least said reduced diameter portion of the spool;
   e. said spool having a taper portion extending from said reduced diameter portion to a first of said land means, the diameter of said taper portion smoothly increasing from said reduced diameter to the land means diameter; and
   f. resilient fluid sealing means disposed in a groove in said body and contacting said spool reduced diameter portion and taper portions in various spool positions, to thereby prevent fluid leakage out of the body through said bore.

2. A fluid control valve comprising:

a body having a longitudinal through bore;

transverse fluid passages in said body communicating with said bore at spaced positions and defining body lands therebetween at said bore;

a spool longer than said bore reciprocally disposed in said bore;

lands on said spool cooperable with said body lands to block fluid flow between adjacent passages, said spool having fluid carrying grooves formed intermediate said spool lands capable of interconnecting adjacent passages in different spool positions;

at least one end of said spool having a smaller diameter than said spool lands, said end being chrome-plated and spaced apart from the nearest spool land, the portion of the spool intermediate said end and nearest land being smoothly tapered from the land diameter to the smaller end diameter; and a compressible sealing member disposed in a groove in the body at said bore operatively engaging said end of reduced diameter and said intermediate tapered portion of the spool in different spool positions to prevent fluid leakage between the spool and body bore.